United States Patent [19]

Propp

[11] Patent Number: 4,754,947

[45] Date of Patent: Jul. 5, 1988

[54] HANGER ADAPTER

[76] Inventor: Clarence E. Propp, Rt. 1, Box 120, College Station, Tex. 77840

[21] Appl. No.: 83,671

[22] Filed: Aug. 7, 1987

[51] Int. Cl.[4] ............................................ F16M 13/00

[52] U.S. Cl. .................................... 248/544; 33/1 N; 248/27.1; 248/57; 248/343; 248/558; 248/DIG. 6

[58] Field of Search ................. 248/343, 544, 558, 56, 248/57, 27.1, 342, 344, 323, 317, DIG. 6; 220/3.9; 362/404; 33/1 N, 412, 534

[56] References Cited

U.S. PATENT DOCUMENTS

| | | | |
|---|---|---|---|
| 2,042,031 | 5/1936 | Watson | 33/1 N |
| 2,140,861 | 12/1938 | Steketee | 248/57 X |
| 2,255,808 | 9/1941 | Porter et al. | 33/1 N |
| 2,645,858 | 7/1953 | Davis | 33/534 X |
| 2,815,918 | 12/1957 | Wolar | 248/343 |
| 2,924,417 | 2/1960 | Bodian | 248/343 |
| 3,518,421 | 6/1970 | Cogdill | 248/57 X |
| 4,405,111 | 9/1983 | Lennon | 211/105.4 X |
| 4,463,923 | 8/1984 | Reiker | 248/27.1 X |
| 4,538,786 | 9/1985 | Manning | 248/57 X |
| 4,659,051 | 4/1987 | Propp et al. | 248/27.1 X |

*Primary Examiner*—David L. Talbott

*Attorney, Agent, or Firm*—Delmar L. Sroufe; Andrés M. Arismendi, Jr.

[57] ABSTRACT

A hanger adapter utilized in hanging fixtures on an inclined ceiling in conjunction with a hanger assembly and a fixture attachment assembly. The hanger adapter provides for the attachment of the hanger and fixture attachment assemblies to same at a position laterally offset from each other so as to effect a substantial alignment of the center of gravity of the fixture and the main axis of the hanger assembly with respect to vertical in an installed position. The hanger adapter has a plate with position indicators, each of which corresponds to a particular selectable, predetermined lateral offset which effects such a substantial alignment for its corresponding preselected angle of ceiling incline and the configuration of the hanger and fixture attachment assemblies utilized. A protractor tool is also provided to simplify and facilitate the installation of the fixture by determining the proper position indicator and associated selectable, predetermined lateral offset on the hanger adapter required for the particular installation to effect the aforementioned substantial alignment.

2 Claims, 3 Drawing Sheets

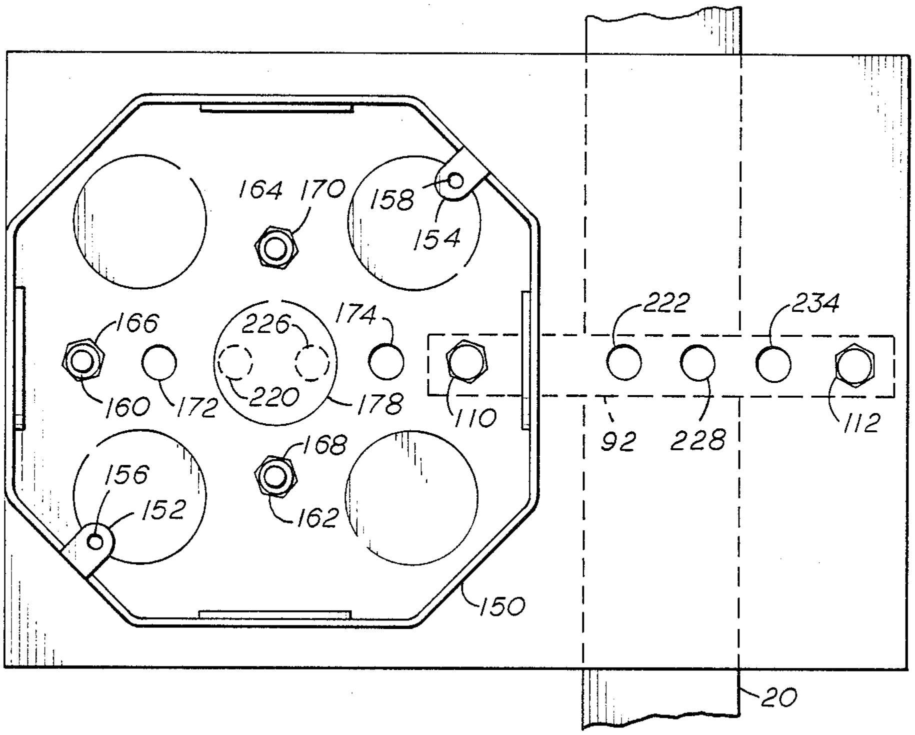
F/G. 3
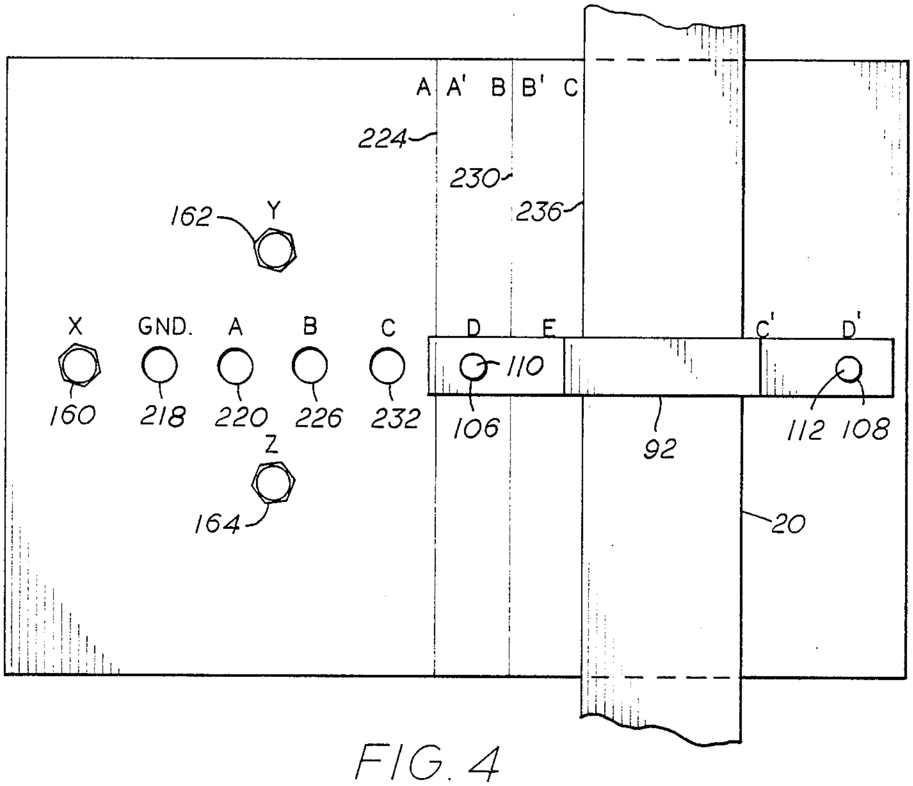
F/G. 4

HANGER ADAPTER

AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to supports between wall studs and ceiling joists and, more particularly, relates to adapters for interjoist supports installed between sloped or inclined ceiling joists.

BACKGROUND OF THE INVENTION

The "after construction" mounting of hangers for ceiling fans, heavy lighting fixtures, potted plants, chairs, etc., has heretofore posed a serious problem in inaccessible locations. Standard electrical trade installation methods for ceiling electrical boxes in new construction will safely hold approximately a 10-pound static load. Ceiling fans, for example, present from 25-pound to 100-pound dynamic loads. Therefore, modifications must be made to safely hang heavier dynamic loads.

Adding ceiling fans or other heavy hanging fixtures to the standard electrical installation in a two-story structure between floors is especially difficult. Additional complexity is introduced when the installation is to be effected on inclined surfaces, such as cathedral or vaulted ceilings. There are two options to effecting such an installation. The first involves the removal or modification of the ceiling covering to provide access. The second, and generally preferred method, involves accomplishing the entire installation through a standard 4-inch electrical box hole in the ceiling. These holes may be located at various distances between ceiling joints.

The conventional method for installing a heavy-duty hanger is to add a structural piece between the ceiling joists from which the electrical box and ceiling fan or other device is hung. If the installation is between a ceiling and an attic, or if there is no top ceiling cover or if the ceiling cover is off, simple and various reliable installation methods are available. However, if the installation must be accomplished through the 4-inch electrical box hole, the hanger must be inserted through the hole and manipulated to form a structural member between the ceiling joists. Furthermore, these methods must consider and take into account the angular forces (torque) exerted upon the hanger assembly by the fixture to retain attachment integrity. Such angular forces result from gravity acting upon the hanging fixture. This gravitational force is translated to and acts upon the hanger assembly via an attachment assembly which attaches the fixture to the hanger assembly. Thus, the attachment assembly acts as a lever upon which the gravitational force acts, thereby exerting a torque on the hanger assembly which attempts to rotate the hanger assembly about its long axis.

In the prior art, some devices have been proposed for providing interjoist supports which can be installed through a small ceiling opening, and exemplary of such state of the art devices are depicted and described in the following U.S. Patents, namely: Steketee—U.S. Pat. No. 2,140,861; Codgill—U.S. Pat. No. 3,518,421; Lenon—U.S. Pat. No. 4,405,111; Reiker—U.S. Pat. No. 4,463,923; and Propp et al.—U.S. Pat. No. 4,659,051. However, the prior art does not address the problem relating to the angular forces or torque exerted upon the hanger assembly installed in an inclined or sloped ceiling which affects the attachment integrity thereof.

These and other limitations and disadvantages of the prior art, and especially of the aforementioned patents, are overcome with the present invention and commercially acceptable embodiments of a hanger adapter the like, together with an installation aid, are herein provided. Such embodiments are especially suitable for use by a person of only limited skill to easily install the hanger adapter of the present invention along with the respective hanger assembly through a small ceiling opening in an inclined or sloped ceiling. The embodiments of the present invention are also capable of use for installations in difficultly accessable locations which are beyond the capabilities of the prior art.

SUMMARY OF THE INVENTION

Accordingly, a feature of the present invention is to provide a hanger adapter which can be installed through a relatively small opening in a wall or ceiling panel.

Another feature is to provide a hanger adapter which essentially nullifies the angular forces or torque exerted on a hanger assembly by a hanging fixture when the installation involves an inclined or sloped ceiling.

A further feature is to provide a protractor tool which aids in the proper installation of the hanger assembly and hanger adapter as a function of the angle of the ceiling with respect to horizontal.

The foregoing features and other features of the hanger assembly of this invention are realized in the hereinafter described embodiment thereof which can be installed through a 4-inch opening in an inclined or sloped ceiling panel. This hanger adapter comprises a plate, means for attaching a hanger assembly to the plate, means for attaching a fixture attachment assembly to the plate at a position laterally offset from the point of attachment of the hanger assembly to the plate in a perpendicular direction relative to the main axis of the hanger assembly, and a plurality of position indicators on the plate at predetermined spaced intervals with respect to an axis of the plate. In an installed position, the fixture attachment assembly allows the fixture hung therefrom to pivot to a substantially vertical position. Illustrative examples of hanger assemblies are those previously referred to in the background of the invention by patent number, which are hereby incorporated by reference.

Each of the position indicators designates a selectable, predetermined lateral offset substantially equal to the product of the tangent of a preselected angle of ceiling incline and the perpendicular distance between a first and a second imaginary plane. Each of these planes is parallel to the ceiling with the first plane intersecting the main axis of the hanger assembly and the second plane intersecting the point about which the fixture pivots with respect to the fixture attachment assembly. In simplistic terms, this perpendicular distance is equal to the sum of the following: (1) the perpendicular distance from the plate to the fixture pivot point, (2) the thickness of the plate, and (3) the perpendicular distance from the plate to the main axis of the hanger assembly.

Thus, for a specific installation, a specific lateral offset corresponding to the actual angle of ceiling incline and above-referenced perpendicular distance may be selected to effect a substantial alignment of the center of gravity of the fixture and the main axis of the hanger assembly with respect to vertical in an installed position. Once such a substantial alignment is effected, the lever or mechanical advantage upon which the weight of the fixture acts is substantially eliminated, thereby essentially nullifying the torque exerted upon the hanger assembly.

The plate for the hanger adapter may take on a rectangular shape. If installation is to be affected through a nominal 4-inch opening in an inclined or sloped ceiling panel, the plate is preferably of such a width which allows the insertion of the plate through this opening.

The means for attaching the hanger assembly to the plate may be, for example, a first pair of load attachment bolts corresponding to the hanger assembly which are inserted through a first slot or a first pair of holes in the plate and then brought into threaded engagement with the load attachment carrier of the hanger assembly and tightened to secure the hanger assembly to the plate of the hanger adapter.

The means for attaching the fixture attachment assembly to the plate may similarly be, for example, a second pair of load attachment bolts corresponding to the fixture attachment assembly which are inserted through a second slot or a second pair of holes in the plate, then inserted through a corresponding slot or pair of holes in the fixture attachment assembly, and thereafter bringing a pair of nuts into threaded engagement with the second pair of load attachment bolts. These bolts are thereafter tightened to secure the fixture attachment assembly to the plate of the hanger assembly. Preferably, the second slot or second pair of holes in the plate are such that the second pair of load attachment bolts may be brought into threaded engagement with same. In this manner, these bolts are secured against rotation when the nuts are tightened onto their respective bolt. As a further alternative, the above-referenced first and second slots both of which are preferably on the same axis may be a single long slot.

As earlier noted, the fixture attachment assembly is attached to the plate at a position laterally offset from the point of attachment of the hanger assembly to the plate. This offset is measured from the main axis of the hanger assembly in a perpendicular direction relative thereto. In a particular embodiment, there is located the first slot or a plurality of pairs of holes in the plate. These are utilized in securing the hanger assembly to the plate at the required specific lateral offset for a particular installation relative to the point of attachment of the fixture attachment assembly to the plate.

In the case of the slot, the position indicators on the plate are in the form of a graduated scale which is preferably graduated in degrees of angle of ceiling incline, or alternatively in the amount of lateral offset, for a particular hanger assembly and fixture attachment assembly, thereby fixing the distance between the first and second imaginary planes. For example, several graduated scales parallel to each other may be on the plate where each corresponds to a different fixed perpendicular distance between these imaginary planes as a function of utilizing different fixture attachment assemblies with a particular hanger assembly.

In the case of the plurality of pairs of holes, the position indicators on the plate designate which pair of holes to use for a particular range of the angle of ceiling incline. As earlier noted, each of the position indicators designate a selectable, predetermined lateral offset which is substantially equal to the product of the tangent of a preselected angle of ceiling incline and the perpendicular distance between the first and the second imaginary planes. Thus, for a particular hole pair whose location was determined with a preselected angle of ceiling incline and fixed perpendicular distance between the first and the second imaginary planes, the particular hole pair may be used for angles of ceiling incline preferably equaling no more than plus or minus 5 degrees with respect to the preselected angle of ceiling incline utilized in determining its location without imposing undue deliterious torque forces on the installed hanger assembly. As such, each of the selectable, predetermined lateral offsets is "substantially equal" to the product of the tangent of a preselected angle of ceiling incline and the perpendicular distance between the first and the second imaginary plane in that each of these offsets may accommodate a range of angles of ceiling incline of preferably no more than plus or minus 5 degrees with respect to the angle utilized in determining or particularly associated with its location.

Typically, fixture attachment assemblies utilized in hanging electrical fixtures include an electrical box. The second pair of load attachment bolts are preferably utilized in attaching the electrical box to the plate, preferably utilizing existing holes in the back of the electrical box. As earlier noted, the fixture attachment assembly allows the fixture to pivot to a substantially vertical position. This pivoting attachment is effected in several ways. Examples of such are a U-shaped bracket cradling a grommet attached to the fixture, a J-hook cradling a similar grommet, or a ball and socket arrangement with the ball portion attached to the fixture and the socket portion attached to the electrical box. In each case, these pivoting attachment means are typically either attached to the inside of the back of the electrical box or to the pair of ears extending inwardly from the outer perimeter and parallel to the open face of same. As a result of the particular structural features of each of these fixture attachment assemblies, the perpendicular distance between the two imaginary planes may differ, thereby affecting specific lateral offset required for a specific installation and the location of the various position indicators and the selectable, predetermined lateral offsets on the hanger adapter. For a fixed set of selectable, predetermined lateral offsets on the hanger adapter, only the range of acceptable angles of ceiling incline per offset is affected.

A protractor tool is also provided which correlates the angle of ceiling incline and the corresponding position indicator and its associated selectable, predetermined lateral offset on the adapter plate, thereby aiding in the selection of the specific lateral offset required for a particular installation. The protractor tool comprises a planar article having at least one straight edge, a plumb bob means attached to the planar adjacent to the straight edge thereof, and a plurality of position indicators on the planar article opposite the straight edge thereof. Each of the position indicators is located thereon in a predetermined positional relationship with respect to the attachment point of the plumb bob means as a function of the angle of ceiling incline and the perpendicular distance between the first and second planes of the particular hanger assembly and fixture attachment assembly. As such, for a fixed perpendicular distance between these two planes, the protractor tool determines the specific lateral offset for a particular installation which effects a substantial alignment of the center of gravity of the fixture and the main axis of the hanger assembly with respect to vertical. Thus, as a function of the angle of ceiling incline, the plumb bob means indicates or points to the specific lateral offset required for a particular installation when the corresponding hanger adapter of the present invention is utilized.

Accordingly, these and other features and advantages of the present invention will become apparent from the following detailed description, wherein reference is made to the figures in the accompanying drawings.

IN THE DRAWINGS

FIG. 3 is a back view of the hanger adapter in FIG. 2 to which is attached an electrical box on one side and a hanger assembly on the other side.

FIG. 4 is a front view of the hanger adapter in FIG. 3.

DESCRIPTION

Figure 1:
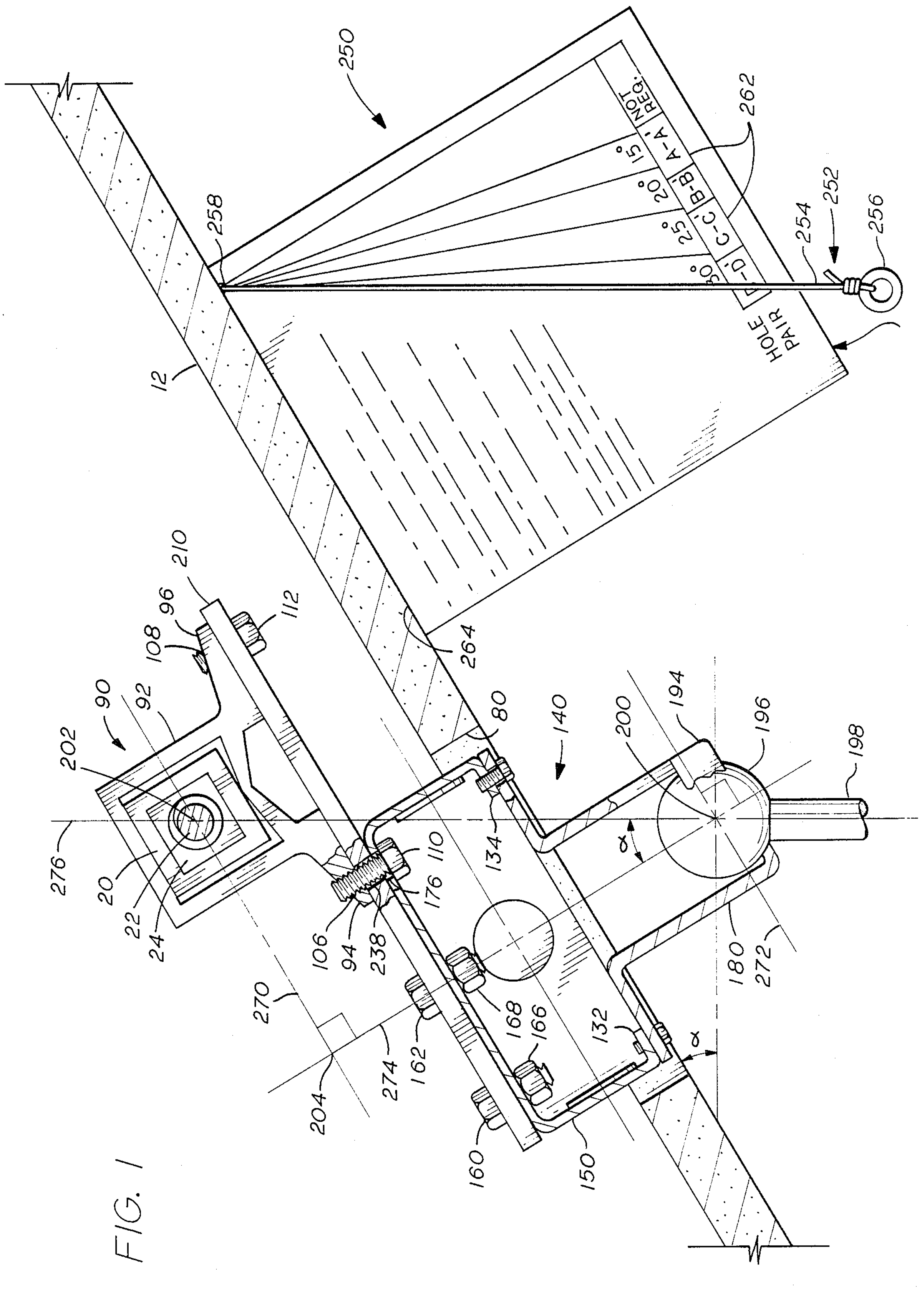
FIG. 1 is a side elevation sectional view of a hanger adapter embodying the concepts of the present invention in an installed position, and a side elevation of a protractor tool also embodying the concepts of the present invention.
Figure 5:
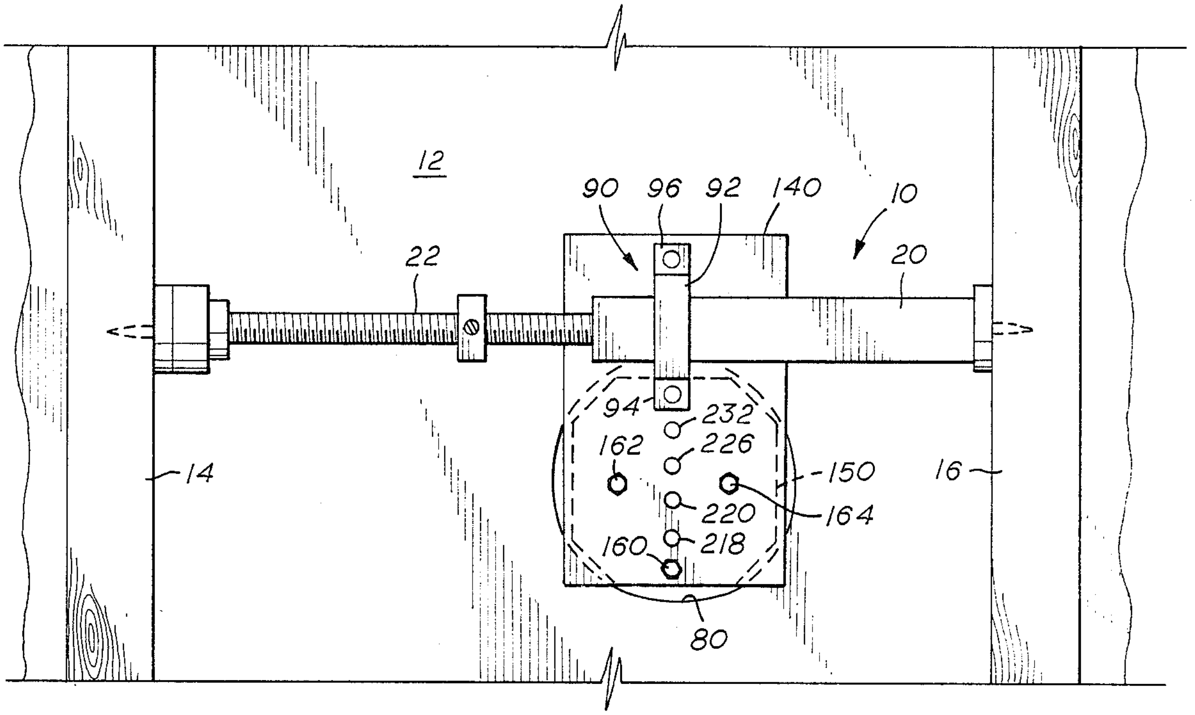
FIG. 5 is a top elevation of the hanger adapter in FIG. 1.

Referring now to the drawings in which like numerals denote similar elements, and more particularly to FIGS. 1 and 5, there is shown by way of illustration, but not of limitation, a hanger assembly 10 mounted above a ceiling 12 of a building which includes space joists 14 and 16 supporting the ceiling 12 and the roof 18 above. The hanger assembly 10 depicted is according to Propp et al. in U.S. Pat. No. 4,659,051, which has previously been incorporated by reference herein. As disclosed and in pertinent part therein, the hanger assembly 10 comprises a jack screw arrangement between an elongated main body 20 and an externally threaded rod 22. One end of the main body 20 is provided with an internally threaded end section 24. The threaded end section 24 receives and threadedly engages one end of the rod 22. The particular load attachment carrier depicted herein is that denoted as element 90 in FIGS. 6 and 7 of the above-referenced patent. The load attachment carrier 90 loosely fits and conforms to the outer size and shape of the main body 20 and the drive collar 46. The load attachment carrier 90 comprises a bracket 92 which loosely fits and conforms to the outer size and shape of the main body 20. A pair of ears, 94 and 96, respectively, extend outwardly and in opposite directions from the lower portion of the bracket 92. The first ear 94 and the second ear 96 have a first threaded hole 106 and a second threaded hole 108, respectively, extending therethrough and perpendicular to the upper surface of each.

The load attachment carrier 90 is secured to the adapter plate 210 by a pair of bolts 110 and 112, respectively. The hanger adapter 140 is positioned such that the bolts 110 and 112 extend through a pair of holes therein; for example, 238 and 240, respectively. The adapter plate 140 is then secured in place by tightening the bolts 110 and 112, respectively.

Figure 2:
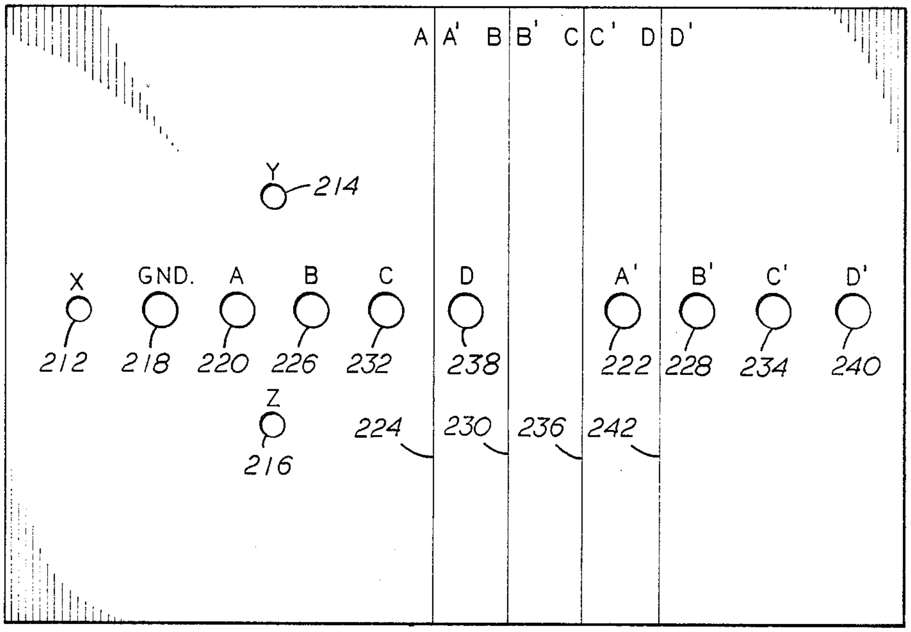
FIG. 2 is a frontal view of a hanger adapter embodying the concepts of the present invention.

The fixture attachment assembly 140 is secured to the adapter plate 210 by means of the bolts 160, 162 and 164, and nuts 166, 168 and 170, respectively. The fixture attachment assembly 140 depicted herein comprises an electrical box 150 and a fixture carrier 180. The electrical box 150 is positioned such that the bolts 160, 162 and 164 extend through corresponding holes therein. These electrical box holes correspond to the holes denoted as X, Y and Z on the adapter plate 210 which are elements 212, 214 and 216, respectively, as shown in FIG. 2. The bolts 160, 162 and 164 prior to positioning of electrical box 150 have been brought into threaded engagement with the threaded holes 212, 214 and 216 on the adapter plate 210 and secured thereto. As shown in FIG. 4, the electrical box 150 is then secured in place with nuts 166, 168 and 170, respectively. If the installation of the electrical box 150 and the load attachment carrier 90 overlap, the installation of bolt 110 is delayed until after the electrical box 150 is secured. At this point, the bolt 110 is then inserted through the electrical box hole corresponding to threaded hole 106 in the carrier ear 94. The bolt 110 is then brought into threaded engagement with hole 106 and secured thereto, thereby completing the attachment of the hanger assembly 10 to the adapter plate 210.

The fixture carrier 180 is secured to the electrical box 150 by means of screws 186 and 188 which are inserted through a first hole 182 and a second hole 184, respectively, and brought into threaded engagement with the threaded ear holes 156 and 158, respectively, which are on electrical box ears 152 and 154, respectively. The screws 186 and 188 are preferably locking screws such as those in U.S. Pat. No. 4,135,633, which is hereby incorporated by reference. The fixture carrier 180 has a socket portion 194 which carries a ball portion 196, which is attached to a downwardly extending connecting rod 198 which, in turn, is connected to the fixture. The socket portion 194 allows the ball portion 196 to pivot about the point 200 such that the main axis of the connecting rod 198 is substantially aligned with respect to vertical 276.

Referring to FIG. 2, there is illustrated the adapter plate 210. The position indicators X, Y and Z designate the holes 212, 214 and 216, respectively, which correspond to holes in the electrical box 150 for attachment thereof to the adapter plate 210. The position indicator GND, which corresponds to hole 218, corresponds to the ground connection hole in the electrical box 150.

The hole pairs A and A', B and B', C and C' and D and D', which correspond to holes 220 and 222, 226 and 228, 232 and 234, and 238 and 240, respectively, correspond to selectable, predetermined lateral offsets which are each substantially equal to the product of the tangent of a preselected angle of ceiling incline designated as $\alpha$ in FIG. 1 and the perpendicular distance between a first imaginary plane 270 and a second imaginary plane 272. Each of the planes 270 and 272 is parallel to the ceiling 12 with the first plane 270 intersecting the main axis 202 of the hanger assembly 10 and the second plane 272 intersecting the pivot point 200 about which the fixture pivots with respect to the fixture attachment assembly. In simplistic terms, this perpendicular distance 274 is equal to the sum of the following:

(1) The perpendicular distance from the plate 210 to the fixture pivot point 200.

(2) The thickness of the plate 210, and (3) The perpendicular distance from the plate 210 to the main axis 202 of the hanger assembly 10.

The lines 224, 230, 236 and 242 designated on plate 210 as lines A, A' and B, B' and C, C' and D, D', respectively, correspond to the alignment of the main axis 202 of the hanger assembly 10 when the hanger assembly 10 is attached to the hole pairs designated as A and A', B and B', C and C' and D and D', respectively.

Referring to FIGS. 2 and 3, the spacing for holes 220, 226, 232 and 238 is such that holes 220 and 226 are accessible by removing the central knockout 178 of electrical box 150 when in an installed position. Furthermore, the holes 232 and 238 correspond positionally with respect to the holes 174 and 176 of electrical box 150 also when in an installed position. This is a preferable arrangement in that no modification need be made to the electrical box 150 other than those usually made by removing a knockout, such as the central knockout 178 in particular. Such an arrangement eliminates any undue complexity in the installation of electrical box 150 or modifications thereto. The holes 222, 228, 234 and 240 are positioned such that the spacing of their respective and associated hole pairs, namely, holes 220, 226, 232 and 238, respectively, substantially equal that of the hole spacing between holes 106 and 108 in the bracket 92.

Having thus defined the hole pattern in the adapter plate 210 and their corresponding position indicators, the selectable, predetermined lateral offsets have been defined. Table 1, which follows, indicates the angle of ceiling incline which corresponds to each of these lateral offsets assuming a perpendicular distance between the planes 270 and 272 of approximately 4 inches. As further indicated in Table 1, the resepective hole pairs may be used for a range of angles of ceiling incline, preferably equaling no more than plus or minus 5° with respect to their specific associated angle of ceiling incline without imposing undue deliterious torque forces on the installed hanger assembly.

TABLE 1

| Hole Pair | Lateral Offset (a) (inches) | (b) tan (α) | Ceiling Angle α (degrees) | Range of Ceiling Angle (c) (degrees) |
|---|---|---|---|---|
| A,A' | 1.03 | .2604 | 14.5 | 9.5–19.5 |
| B,B' | 1.53 | .3868 | 21.0 | 16.0–26.0 |
| C,C' | 2.06 | .5207 | 27.5 | 22.5–32.5 |
| D,D' | 2.56 | .6471 | 33.0 | 28.0–38.0 |

(a.) Lateral offset is equal to the distance between the points 204 and 200 on the plane 270 in FIG. 1.
(b.) tan (α) = (lateral offset)/(3.956 inches) where 3.956 inches equals the perpendicular distance between planes 270 and 272 in FIG. 1, which is the distance between points 204 and 200 in FIG. 1.
(c.) The designated hole pair may be utilized for angles of ceiling incline equaling preferably no more than plus or minus 5 degrees with respect to the angle of ceiling incline corresponding most closely to the lateral offset defined by this hole pair.

Having this information in hand, the protractor tool 250 illustrated in FIG. 1, may then be readily composed. As illustrated in FIG. 1, the protractor tool 250 has a straight edge 264 and a plumb bob means 252 which is attached at point 258 adjacent to said straight edge 264. A plurality of rays 260 (typical) radiate from the point 258 and each of these rays correspond to an angle of ceiling incline measured with respect to said straight edge 264. Having thus determined the range of applicable angles of ceiling incline corresponding to each of the hole pairs, a graduated scale opposite the straight edge 264 may then be positioned on the protractor tool 250 such that the plumb bob means 252 designates the acceptable hole pair corresponding to the selectable, predetermined lateral offset on the adapter plate 210. Thus, when the straight edge 264 is adjacent to the ceiling 12 and parallel to the direction of ceiling incline and the protractor tool 250 is perpendicular to the ceiling 12, as shown in FIG. 1, the plumb bob means 252 determines the desired hole pair designation 262 (typical) required for the particular installation. As shown in FIG. 1, the plumb bob means 252 may simply comprise a string 254 attached at the point 258 on one end and at the other end tied to a weight 256. As such, the protractor tool 250 greatly simplifies and facilitates the installation of the hanger assembly 10 on an inclined ceiling 12 by providing a direct indication of the proper hole pairs which effect a substantial alignment to the center of gravity of the fixture and the main axis 202 of the hanger assembly with respect to vertical 276 in an installed position. Once such a substantial alignment is effected, the lever or mechanical advantage upon which the weight of the fixture acts is substantially eliminated, thereby essentially nullifying the torque exerted on hanger assembly 10.

Referring now to FIG. 1, installation of the hanger assembly 10, adapter plate 210 and the fixture attachment assembly 140, shall be discussed. First, the protractor tool 250 is placed such that the straight edge 264 is adjacent to ceiling 12 such that the straight edge 264 is substantially aligned in a direction of ceiling incline, as shown in FIG. 1. The protractor tool 250 is then utilized to select the appropriate hole pair by designating the corresponding position indicator, for example, A, A'; B, B'; C, C'; or D, D'. The bolts 160, 162 and 164 are then secured to their respective threaded hole 212, 214 and 216, designated as X, Y and Z on the adapter plate 210. The electrical box 150 is then attached to bolts 160, 162 and 164 protruding on the opposite side of said adapter plate 210, as shown in FIG. 3, using the nuts 166, 168 and 170, respectively. The electrical box 150 is then inserted through the ceiling hole 80 and the line corresponding to the selected hole pair is utilized to mark the ceiling 12 so as to provide a visual indication of the proper alignment of the main axis 202 of the hanger assembly 10. The hanger assembly 10 is then installed according to its respective installation instructions, in this case according to U.S. Pat. No. 4,659,051, with the exception that the hanger assembly 10 is now offset from the central hole 80 location, as shown in FIGS. 1 and 5. The electrical box 150 is then removed from the adapter plate 210 by removing the nuts 166, 168 and 170. With the adapter plate 210 oriented such that the bolts 160, 162 and 164 extend downward, the adapter plate 210 is attached to the bracket 92 by inserting bolt 112 through one of the designated hole pairs and threadedly engaging threaded hole 108 in the carrier ear 96. As depicted in FIG. 1, the protractor tool 250 designates the hole pair D, D', which corresponds to holes numbered 238 and 240, respectively. Therefore, the bolt 112 is inserted through the hole 240 designated as D' and brought into threaded engagement with the hole 108 in the carrier ear 96. The adapter plate 210 is secured to the bracket 92 by tightening the bolt 112 such that the hole 238 designated as D is in alignment with the hole 106 in the carrier ear 94 of the bracket 92. After the electrical wires have been secured to the electrical box 150, the electrical box 150 is then mounted to the adapter plate 210 by inserting the bolts 160, 162 and 164 through the holes corresponding to same, as shown in FIG. 3. The electrical box 150 is thereafter secured to the bolts 160, 162 and 164 utilizing the nuts 166, 168 and 170, respectively. In this particular installation, the bolt 110 is inserted through the hole 176 in the electrical box 150 and through the hole 238 designated as D in the adapter plate 210 and brought to threaded engagement with the hole 106 in the carrier end 94 of the bracket 92 and secured thereto by tightening bolt 110. The socket portion 180 of the fixture attachment assembly 140 is thereafter attached to the electrical box 150 by using the screws 186 and 188, preferably locking screws, which are inserted through the holes 182 and 184, respectively. Thereafter, the screws 186 and 188 are brought into threaded engagement with the holes 156 and 158 in the electrical box ears 152 and 154, respectively. The socket portion 180 is then secured to the electrical box 150 by tightening the screws 186 and 188. With the ball portion 196 of the fixture attachment assembly 140 resting within the socket portion 180 thereof and the connecting rod 198 connected to the ball portion 196, the remainder of the installation is completed using the respective fixture mounting instructions.

In the foregoing embodiments, there is provided a hanger adapter 210 which provides an easy means of installing a fixture on an inclined ceiling without compromising the attachment integrity of the hanger assembly 10 used therein. The adapter plate 210 allows the selection of a specific lateral offset between the attachment point of the hanger assembly 10 and the fixture attachment assembly 140 to the adapter plate 210 which effects a substantial alignment of the fixture and the main axis 202 of the hanger assembly with respect to vertical 276 in an installed position. Once such a substantial alignment is effected, the lever or mechanical advantage upon which the weight of the fixture acts is essentially eliminated, thereby nullifying the torque exerted upon the hanger assembly 10. Furthermore, there is also provided a protractor tool 250 which provides a direct determination of the specific lateral offset required in a particular installation with respect to the angle of ceiling incline.

Therefore, it will be readily noted that a novel and effective adapter plate and associated protractor tool have been provided. The parts cooperate in an effective manner to retain the hanger assembly in a tight and tenacious attachment to the joints or studs and substantially eliminate the torque exerted by the weight of the fixture upon the hanger assembly when installation is effected in an inclined ceiling.

It will be apparent from the foregoing that many other variations and modifications may be made in the apparatus and methods hereinbefore described, by those having experience in this technology, without departing from the concept of the present invention. Accordingly, it should be clearly understood that the apparatus and methods depicted in the accompanying drawings and referred to in the foregoing description are illustrative only and not intended to have limitations on the scope of the invention.

What is claimed is:

1. In a hanger assembly for spanning and attachment between a pair of spaced joists, studs and the like elements having opposed surfaces and a fixture attachment assembly for hanging a fixture from said hanger assembly which allows said fixture to pivot to a substantially vertical position, a hanger adapter for substantially aligning the center of gravity of said fixture hung from said hanger assembly and the main axis of said hanger assembly with respect to vertical when said hanger assembly is installed on an inclined ceiling, said hanger adapter comprising:

- a plate;
- means for attaching said hanger assembly to said plate;
- means for attaching said fixture attachment assembly to said plate at a position laterally offset from the point of attachment of said hanger assembly to said plate in a perpendicular direction relative to the main axis of said hanger assembly; and
- a plurality of position indicators on said plate located at predetermined spaced intervals with respect to an axis of said plate, each of said position indicators designating a selectable, predetermined lateral offset substantially equal to the product of the tangent of a preselected angle of ceiling incline and the perpendicular distance between a first and a second imaginary plane, each of said planes being parallel to said ceiling with said first plane intersecting the point about which said fixture pivots with respect to said fixture attachment assembly, thereby allowing the selection of a specific lateral offset which effects a substantial alignment of the center of gravity of said fixture and the main axis of said hanger assembly with respect to vertical in an installed position, said specific lateral offset corresponding to the actual angle of ceiling incline of said ceiling and the perpendicular distance between said first and said second planes for said hanger assembly.

2. A protractor tool for use as an aid for installing a hanger assembly and a fixture attachment assembly on an inclined ceiling utilizing a hanger adapter as claimed in claim 1 for hanging a fixture therefrom, said hanger assembly spanning between and attaching to a pair of spaced joists, studs and the like elements having opposed surfaces, said fixture attachment assembly allowing said fixture to pivot to a substantially vertical position, and said hanger assembly and said fixture assembly attached to said hanger adapter, said protractor tool comprising:

- a planar article having at least one straight edge;
- a plumb bob means attached to said planar article adjacent to said straight edge; and
- a plurality of position indicators on said planar article opposite said straight edge, each of said position indicators located on said planar article in a predetermined positional relationship relative to the attachment point of said plumb bob means as a function of the angle of ceiling incline and each of said position indicators on said planar article corresponding to the position indicators on said hanger adapter which designate a selectable, predetermined lateral offset between the points of attachment of said hanger assembly and said fixture assembly to said adapter plate which is perpendicular to the main axis of said hanger assembly and is substantially equal to the product of the tangent of a preselected angle of ceiling incline and the perpendicular distance between a first and a second imaginary plane, each of said planes being parallel to said ceiling with said first plane intersecting the main axis of said hanger assembly and said second plane intersecting the point about which said fixture pivots with respect to said fixture attachment assembly, thereby allowing the selection of a specific lateral offset which effects a substantial alignment of the center of gravity of said fixture and the main axis of said hanger assembly with respect to vertical in an installed position, said specific lateral offset corresponding to the actual angle of ceiling incline of said ceiling and the perpendicular distance between said first and said second planes for said hanger assembly and said specific lateral offset being determined by placing said straight edge adjacent to said ceiling and indicating and selecting the position indicator which corresponds to said specific lateral offset on said planar article indicated by said plumb bob means.

* * * * *